United States Patent [19]

Kyohzuka

[11] Patent Number: 4,951,206
[45] Date of Patent: Aug. 21, 1990

[54] THROTTLE VALVE OPENING DETECTING APPARATUS FOR A VEHICLE ENGINE

[75] Inventor: Takahiro Kyohzuka, Hiroshima, Japan

[73] Assignee: Mazda Motor Corporation, Hiroshima, Japan

[21] Appl. No.: 204,812

[22] Filed: Jun. 10, 1988

[30] Foreign Application Priority Data

Jun. 11, 1987 [JP] Japan .................................. 62-146560

[51] Int. Cl.[5] ..................... G06F 15/20; H04L 25/06
[52] U.S. Cl. .................. 364/424.1; 73/118.1;
364/431.05; 364/571.05
[58] Field of Search ............ 364/571.05, 571.04,
364/571.02, 559, 431.05, 431.06, 431.09, 424.1;
73/117, 117.2, 117.3, 118.1; 123/478

[56] References Cited

U.S. PATENT DOCUMENTS

| | | | |
|---|---|---|---|
| 4,490,804 | 12/1984 | Martinsons | 364/571.05 |
| 4,515,009 | 5/1985 | Hasegawa et al. | 73/118.1 |
| 4,581,924 | 4/1986 | Otobe et al. | 73/118.1 |
| 4,616,504 | 10/1986 | Overcash et al. | 73/118.1 |
| 4,679,440 | 7/1987 | Okamura | 73/118.1 |
| 4,688,420 | 8/1987 | Minagawa | 73/118.1 |
| 4,703,649 | 11/1987 | Eitoku et al. | 73/118.1 |
| 4,715,220 | 12/1987 | Eitoku et al. | 73/118.1 |
| 4,718,272 | 1/1988 | Plapp | 364/431.05 |
| 4,719,795 | 1/1988 | Eitoku et al. | 73/118.1 |

Primary Examiner—Parshotam S. Lall
Assistant Examiner—Christopher L. Makay
Attorney, Agent, or Firm—Fleit, Jacobson, Cohn, Price, Holman & Stern

[57] ABSTRACT

A throttle valve opening detecting apparatus of an automatic transmission for detecting an angular position or opening of a throttle valve for controlling the amount of air-fuel mixture reaching cylinders of a vehicle engine that includes a throttle valve position sensor for providing an output proportional to an angular position or opening of the throttle valve. A memory device memorizes a minimum value of the output to set a reference output for a closed position of the throttle valve. A renewing device decreasingly renews the reference output when the throttle valve position sensor provides an output smaller than the reference output set in the reference output. The renewing device increasingly renews the reference output when the throttle valve position sensor provides an output larger than the reference output and smaller than a preset reference output for a predetermined or preselected period of time.

19 Claims, 7 Drawing Sheets

_4,951,206_

THROTTLE VALVE OPENING DETECTING APPARATUS FOR A VEHICLE ENGINE

FIELD OF THE INVENTION

The present invention relates to apparatus for detecting a ratio of opening of a throttle valve used in a vehicle engine.

BACKGROUND OF THE INVENTION

For detecting an opening ratio of a throttle valve by a throttle sensor, it is generally necessary to accurately determine an output from a throttle valve sensor relative to a reference output for a fully closed position of the throttle valve. One such a throttle valve opening detecting device is disclosed in, for example, Japanese Patent Unexamined Publication No. 56-107,926 entitled "DEVICE FOR DETECTING ENTIRE CLOSING OF THROTTLE VALVE OF INTERNAL COMBUSTION ENGINE" laid open Aug. 27, 1981. The throttle valve opening detecting device taught by the above mentioned Japanese Patent Unexamined Publication detects the latest minimum value of a varying output voltage from a throttle valve opening sensor which is taken for a reference output for a closed position of the throttle valve.

Practically, however, such throttle valve sensors sometimes detect output voltages lower than an output voltage to be provided when the throttle valve is actually fully closed. This fluctuation is due to a drop of power of a battery, noises or cranking. If such a fluctuated or incorrect output voltage is taken for a reference output voltage for the fully closed throttle valve for controlling an automatic transmission so as to change gear ratio or to lock or unlock a lockup torque converter, a shift point at which the automatic transmission upshifts into high or downshift into low range undesirably varies or it is temporarily disabled to timely release a lockup condition of the automatic transmission, in particular a lockup torque converter in association with the automatic transmission.

Also an idle switch is known which is actuated when a throttle valve is fully closed to set an output from a throttle valve opening sensor as a reference output for a fully closed position of the throttle valve. However, the provision of such idle switches needs wire for itself, resulting in a loss of space and cost.

OBJECT OF THE INVENTION

It is, therefore, an object of the present invention to provide an improved throttle valve opening detecting apparatus which can establish a reference output from a throttle valve opening sensor for a closed position of a throttle valve so as to detect an accurate opening ratio of the throttle valve.

SUMMARY OF THE INVENTION

According to the present invention, a throttle valve opening detecting apparatus comprises a throttle valve opening sensor for providing an output proportional to an opening or angular position of a throttle valve, reference output setting means for memorizing and renewably setting a minimum output provided from the throttle valve opening sensor as a reference output for a closed position of the throttle valve, and operating means for obtaining an opening ratio of the throttle valve based on a ratio of a present output relative to the reference output. The reference output setting means includes means for decreasingly renewing the reference output when the throttle valve opening sensor provides an output which is continued unchanged and smaller than the reference output set in said reference output setting means for a certain, predetermined or preselected period of time and means for increasingly renewing the reference output when the throttle valve opening sensor provides an output which is continued unchanged and larger than the reference output previously set in said reference output setting means but smaller than a preset reference output for at least a certain, predetermined or preselected period of time. Upon increasingly renewing the reference output, a value of output which is established as a renewed reference output is as large as that of a current reference output added by a certain or preselected value of output.

According to a preferred embodiment of the present invention, a reference output for a closed position of a throttle valve is renewed and, based on the renewed reference output, the output characteristic of the throttle valve position sensor is corrected, so that a current opening ratio of the throttle value can be accurately detected independently on changes of power of a battery such as fluctuation or drop of power of a battery. This leads to an accurate control of the transmission of power from a vehicle engine to wheels.

BRIEF DESCRIPTION OF THE DRAWING

Still other aspect of the present invention and more specific features will become apparent to those skilled in the art from the following description of the present invention of the preferred embodiments described together with the accompanying drawings in which.

DETAILED DESCRIPTION OF THE INVENTION

A throttle valve opening detecting apparatus according to the present invention is incorporated in an automatic transmission of a vehicle engine. Because such automatic transmissions are well known, this description will be directed in particular to elements forming parts of or cooperating directly with apparatus embodying the present invention. It is to be understood, however, that engine elements not specifically shown or described may take various forms known to those skilled in the vehicle art.

Figure 1:
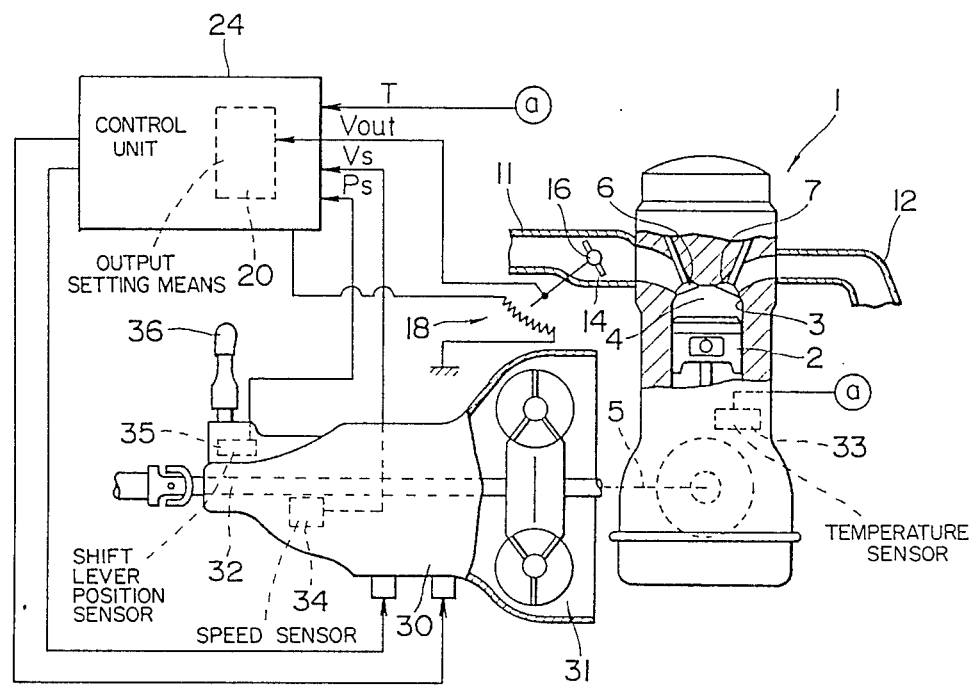
FIG. 1 is a schematic diagrammatical illustration of a throttle valve opening detecting apparatus constructed in accordance with a preferred embodiment of the present invention.

Referring now to FIG. 1, there is shown an vehicle engine 1 with its associated piston 2 snugly received in a cylinder 3. Above the piston 2, there is formed a combustion chamber 4 in the cylinder 3. In intake and exhaust ports, there are seated intake and exhaust valves 6 and 7 facing on the combustion chamber 4.

Connected to the vehicle engine 1 are intake and exhaust manifolds 11 and 12 in communication with the combustion chamber 4 through the intake and exhaust valves 6 and 7, respectively. Inside the intake manifold 11, there is provided a throttle valve 14 of which a valve shaft 16 is attached to a throttle valve opening or angular position sensor (which is hereinafter referred to as a throttle valve position sensor) 18 comprising such as a variable resistance well known in the art. As the throttle valve 14 swings open, the throttle valve position sensor 18 generates an electric output $V_{out}$ proportional to an opening of the throttle valve 14 or an angle through which the throttle valve opens. A minimum output of the varying output is rated as a reference output which is regarded to correspond to an output provided for a closed position of the throttle valve 14 and memorized in a reference output setting means 20 in a control unit 24. This reference output setting means 20 renews the reference output with the minimum output provided till then. Specifically, in this embodiment, the throttle valve position sensor 18 is designed to provide an output voltage between 1 V and 4 V for the entire range of opening of the throttle valve 14. A throttle valve opening detecting device according to the present invention comprises the throttle valve position sensor 18 and the reference output setting means 20 and is adapted to memorize a minimum output of an increasingly or decreasingly varying output from the throttle valve position sensor 18 therein so as to renew or update the reference output. This minimum output is set as a latest reference output in the reference output setting means 20. On the other hand, when the throttle valve position sensor 18 provide an output which is continued unchanged and larger than the latest reference output but smaller than a preset reference output, a new reference output is provided by adding a certain value of output to the latest reference output and set in the reference output setting means 20.

The control unit 24 comprises a typical digital microcomputer and controls operation of an automatic transmission 30 for effecting a change in ratio between engine rpm and driving wheel rpm and operation of a lockup torque converter 31 based on various engine operating factors such as a temperature signal T representative of the temperature of a water coolant for the engine detected by a temperature sensor 33 provided in association with the vehicle engine 1, a speed signal $V_s$ representative of the vehicle speed detected by a speed sensor 34 coupled to an output shaft 32 of the automatic transmission 30, a position signal $P_s$ representative of the operated position of a shift lever 36 detected by a shift lever position sensor 35. Operation and fabrication of these sensors is known to those skilled in the art and needs not be described in detail therein. The details of these operations of the automatic transmission and torque converter are described below in connection with the flow chart in FIGS. 2 and 3.

Figure 6:
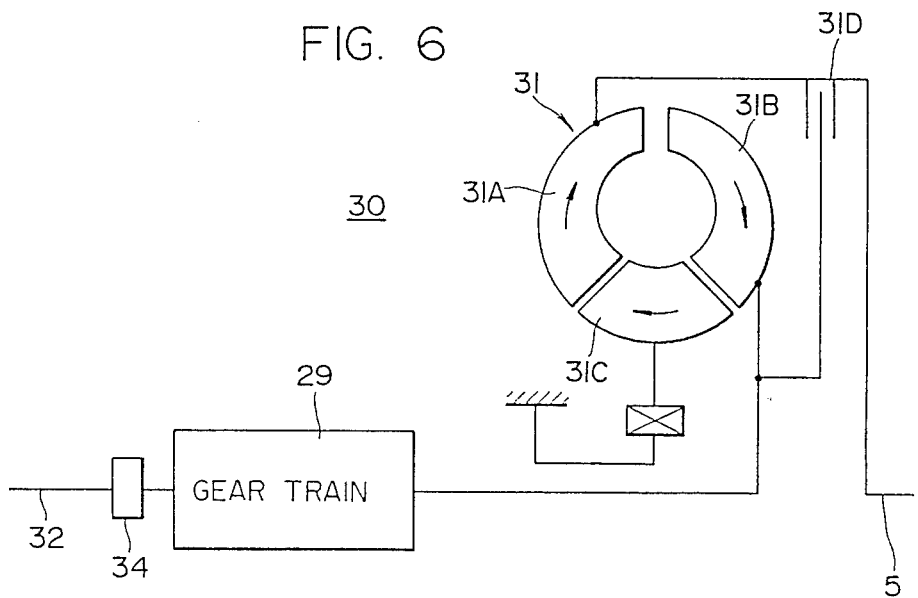
FIG. 6 is a schematic diagrammatical illustration of an automatic transmission with a lockup torque converter which is controlled by the control unit shown in FIG. 1.

In order to understand the operation of the throttle valve opening detecting device of the present invention, brief description is given with reference to FIG. 6 in conjunction with FIG. 1. The automatic transmission 30 such as four-speed automatic transmission comprises the lockup torque converter 31 and a gear train 29 which is well known per se. The lockup torque converter 31, which is schematically, diagrammatically illustrated in a skeleton form in FIG. 6, comprises a front torus or turbine 31A, a rear torus or pump 31B and a stator 31C. A lockup clutch 31C is provided between the turbine 31A coupled to a crankshaft 5 of the vehicle engine 1 and the pump 31B coupled to an input shaft of the gear train 29 so as to lock or unlock the lockup torque converter 31. This lockup clutch 31D is controlled directly or indirectly with a control signal provided by the control unit 24. The gear train 29 is of the type having four forward speed transmission modes, reverse transmission mode and neutral mode. Such a four speed automatic transmission with a lockup torque converter is well known to those skilled in the art, so that a more detailed description is unnecessary.

Figure 2:
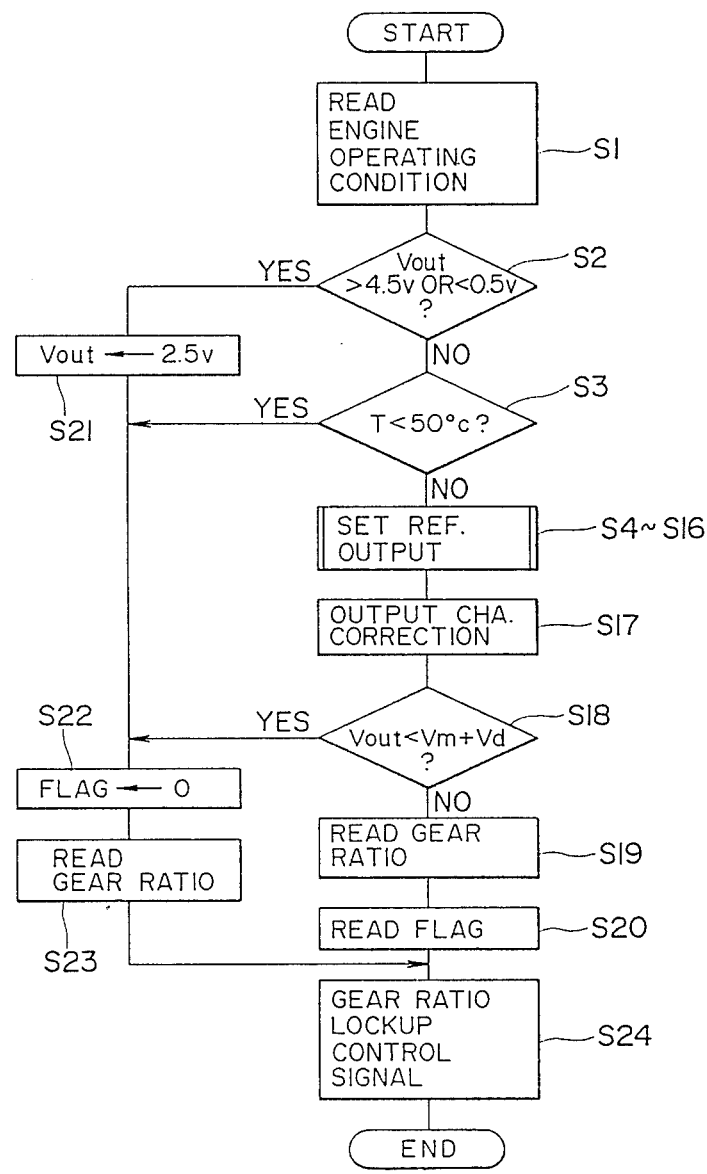
FIG. 2 is a flow chart illustrating a general sequence or main routine for a control unit which controls operation of an automatic transmission with a lockup torque converter.
Figure 3:
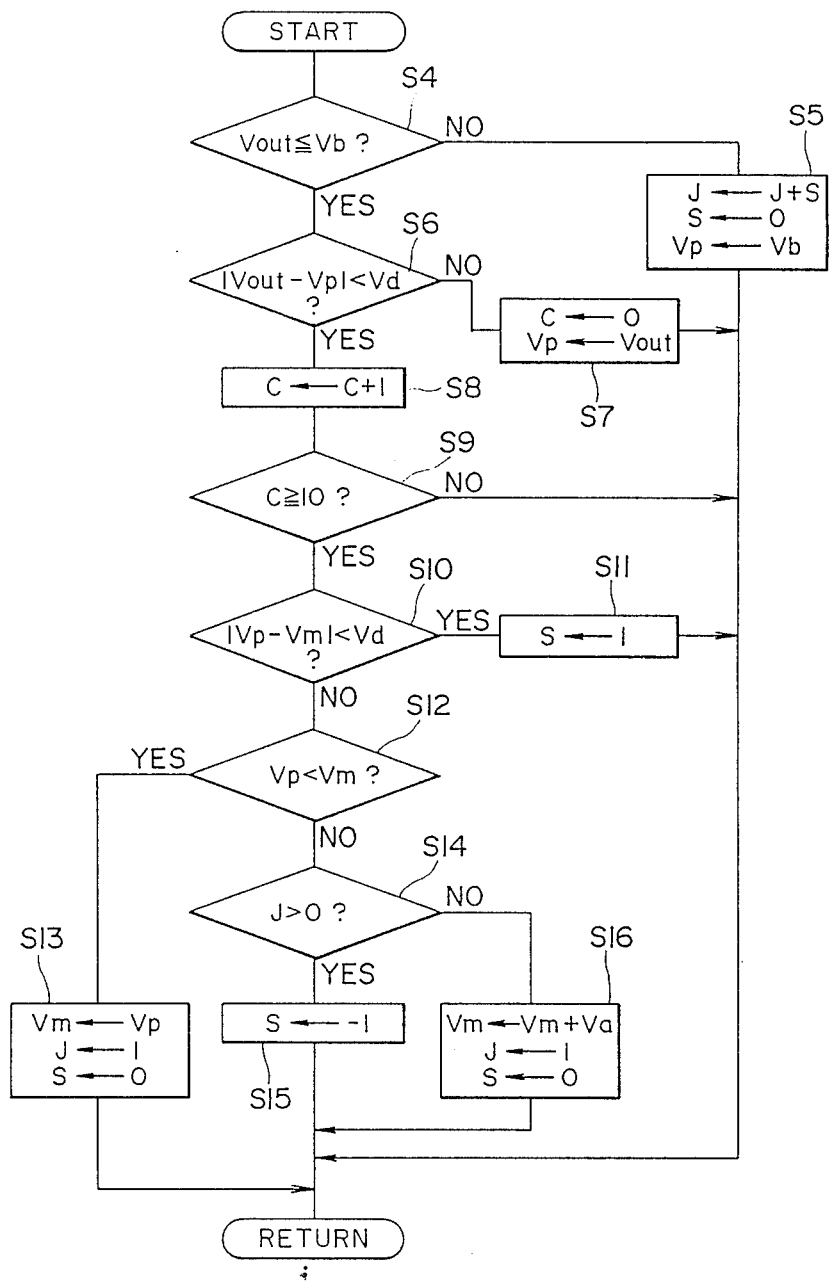
FIG. 3 is a flow chart illustrating a reference output setting subroutine for the control unit.

The operation of the throttle valve opening detecting device is best understood by reviewing FIGS. 2 and 3, which are flow charts illustrating a general routine and a reference output setting subroutine, respectively, for a microcomputer in the control unit 24 and to which reference is now made. Programming a microcomputer is a skill well understood in the art. The following description is written to enable a programmer having ordinary skill in the art to operate an appropriate program for the microcomputer. The particular details of such a program would of course depend upon the architecture of the particular microcomputer selected.

Referring now to FIG. 2, which is a flow chart of a main or general sequence routine for the microcomputer of the control unit 24 which is continuously repeated with a constant period of time, for example approximately 0.05 sec. The first step S1 in FIG. 2 is to read the condition of various sensors 33–35. Based on a present output voltage $V_{out}$ from the throttle valve position sensor 18, the speed signal $V_s$ from the speed sensor 34 the temperature signal T from the temperature sensor 33 and the position signal $S_p$ from the shift lever position sensor 35, a first decision is made at a step S2: "is the present output voltage $V_{out}$ larger than 4.5 V or smaller than 0.5 V?" If the answer to the first decision is no, indicating the throttle valve position sensor 18 operates normally, then, another decision is made at a step S3: "is the temperature T of engine cooling water lower than 50° C.?" If the answer to the other decision is no, indicating the vehicle engine is warm enough to operate normally but not heated over an efficient operating temperature, a reference output setting subroutine is called for.

Referring now to FIG. 3, which is a flow chart of the reference output setting subroutine in the reference output setting means 20, the first step S4 in FIG. 3 is to make a decision: "is the present output value $V_{out}$ from the throttle valve position sensor 18 as small as or smaller than a preset reference output $V_b$?" Established for this preset reference output $V_b$ is an output slightly larger than an output expected to be provided from the throttle valve position sensor 18 when the throttle valve 14 is fully closed.

If the answer to the first decision at the step S4 is no, then, the preset reference output $V_b$ is rated as the last output $V_p$ for the next reference output setting sequence, while setting score S and evaluation value J to zero (0) and the present evaluation value J added by the present score S, respectively at a step S5. The step S5 orders return to the step S4 for the next reference output setting sequence. It is noted that the evaluation value J is an index for determining the stability of reference output and the score S is a value (which takes a value +1, −1 or zero in this embodiment) by which the evaluation value J is incremented.

On the other hand, if the answer to the decision at the step S4 is yes, this indicates that the present output $V_{out}$ is neither equal to nor larger than the preset reference output $V_b$ and that the throttle valve 14 is possibly closed. Then, at a step S6, a decision is made whether the present output $V_{out}$ has a considerable difference from the last output $V_p$ subjected to a preceeding reference output setting sequence prior to the present output $V_{out}$. Specifically, decided at this step S6 is whether the absolute difference between the present output $V_{out}$ and the last output $V_p$ is smaller than a predetermined or preselected allowable error of output $V_d$ or not.

If the answer to the decision at the step S6 regarding the stability of current output of the throttle valve position sensor 18 is no, then, the present output $V_{out}$ is rated as the last output $V_p$ for the next reference output setting sequence, while resetting a "C" counter in the microcomputer of the control unit 24 to zero (0) at a step S7, which orders return to the step S17 of the main routine of FIG. 2.

If the answer to the decision at the step S6 is yes, indicating that the present output $V_{out}$ from the throttle valve position sensor 18 is stable or unchanged relative to the last output $V_p$, the "C" counter in the microcomputer of the controller unit 24 is incremented by count one at a step S8. Then, a decision is made at a step S7: "has the "C" counter counted as many as or more than ten counts?" If the answer to the decision at the step S8 is yes, this indicates that the output $V_{out}$ is continuously maintained stable or unchanged for at least a predetermined period of time, for example approximately 0.5 sec because the reference output setting sequence of this embodiment is repeated with a period of 0.05 sec. Therefore, another decision is made at a step S10: "is the absolute difference between the last output $V_p$ and the reference output $V_m$ set in the reference output setting means 20 smaller than the allowable error of output $V_d$?" If the answer to the decision at the step S10 is yes, indicating the last output $V_p$ is as small as the reference output $V_m$, then, score S is set to one (1) at a step S11. The step S11 orders return to the step S17 of the main routine of FIG. 2.

If the answer to the decision at the step S10 is no, another decision is made at the step S12: "is the last output $V_p$ smaller that the reference output $V_m$?" If the answer to the decision at the step S12 is yes, the last output $V_p$ is rated and set as a new reference output $V_m$ in the reference output setting means 20 for the next reference output setting sequence at a step S13, while score S and evaluation value J are set to zero (0) and plus one (+1), respectively. Otherwise, another decision is made at a step S14, "is the evaluation value J larger than zero (0)?" If the evaluation value J is larger than zero (0), then, score S is set to minus one (−1) at a step S15 which orders return to the step S17. If the answer to the decision at the step S14 is no, indicating the evaluation value J is equal to zero (0) which means the reference output $V_m$ now set in the reference output setting means 20 is unstable or improper, a certain value of output $V_a$ is added to the reference output $V_m$ to set a new reference output $V_m$ in the reference output setting means 20, while score S and evaluation value J are set to zero (0) and plus one (+1), respectively, at a step S16 which orders return to the step S17 of the main routine of FIG. 2.

Figure 4:
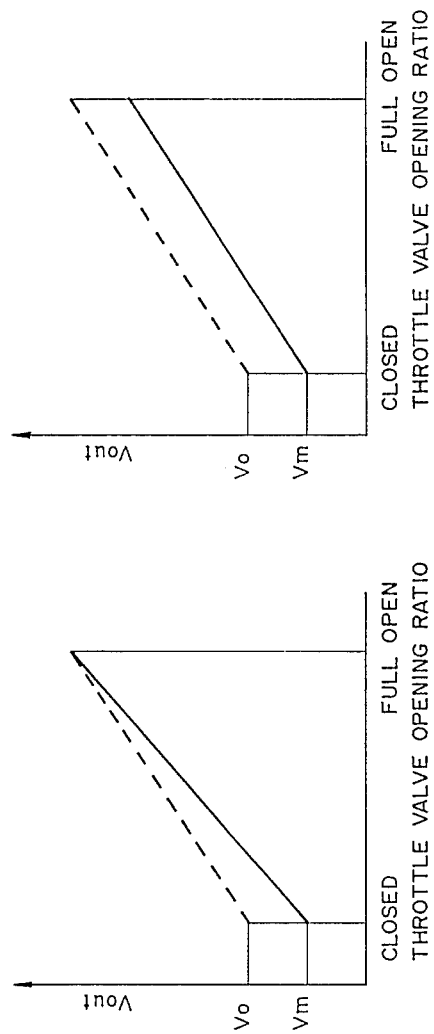
FIG. 4A is a graph showing correction of the output characteristic of a throttle valve position sensor of the type cooperating a carburator fuel injection system.
FIG. 4B is a graph, similar to FIG. 4A, showing correction of the output characteristic of a throttle valve position sensor of the type cooperating an electronically controlled fuel injection system.

Referring back to the main routine in FIG. 2, after having set a reference output $V_m$ through the steps S4 to S16, the output characteristic of the throttle valve position sensor 18 is corrected according to the reference output value $V_m$ set in the reference output setting means 20. A corrected output characteristic curve is shown by a solid line in FIG. 4A for a vehicle engine equipped with a carburetor type fuel system and in FIG. 4B for a vehicle engine equipped with an electronically controlled fuel injection system. In FIGS. 4A and 4B, a chained line shows a standard output characteristic curve of the throttle valve position sensor 18. Based on the corrected output characteristic curve, an opening rate of the throttle valve 14 is obtained corresponding to a current actual output $V_{out}$.

After the correction of output characteristic curve, a third decision in the main routine in FIG. 2 is made at a step 18: "is the output $V_{out}$ from the throttle valve position sensor 18 smaller than the reference output $P_m$ with the allowable error of output $V_d$?" If the answer to the third decision at the step S18 is no, this indicates that the throttle valve 14 declines to open. Therefore, the control unit 24 reads in a present gear ratio for a shift range indicated by the shift lever position signal $P_s$ with reference to an automatic vehicle speed control schedule shown in FIG. 7 at a step 19. Thereafter, according to the vehicle speed $V_s$, the control unit 24 reads the state of flag on an lock-up control schedule shown in FIG. 7 at a step 20. If "FLAG 0" is read in, the control unit 24 provides an unlock signal for unlocking the lockup torque converter 31 of the automatic transmission 30. On the other hand, if "FLAG 1" is read in, the control unit 24 provides a lock signal for locking the lockup torque converter 32 of the automatic transmission 30. According to the state of flag and gear ratio read in, the control unit 24 controls the automatic transmission 30. If the answer to the first decision regarding the operating condition of the throttle valve position sensor 18 is yes, this indicates the throttle valve position sensor 18 is disordered or abnormally operates, then the reference output setting means 20 set therein an output for a specific opening rate of the throttle valve, for example an output of 2.5 V for a half throttle, as a reference output in disregard of an output actually to be provided from the throttle valve position sensor 18 so as to assume a half throttle at a step S22. Then, the state of flag is changed to "FLAG 0" at a step S23 for inhibitting locking control of the lockup torque converter 31. Thereafter, the control unit 24 reads in a gear ratio with reference to the automatic vehicle speed control schedule shown in FIG. 7 at a step S24. The control unit 24 provides an unlock signal for unlocking the lockup torque converter 32 of the automatic transmission 30 and a gear ratio control signal for the automatic transmission 30 at the step S21.

Figure 7:
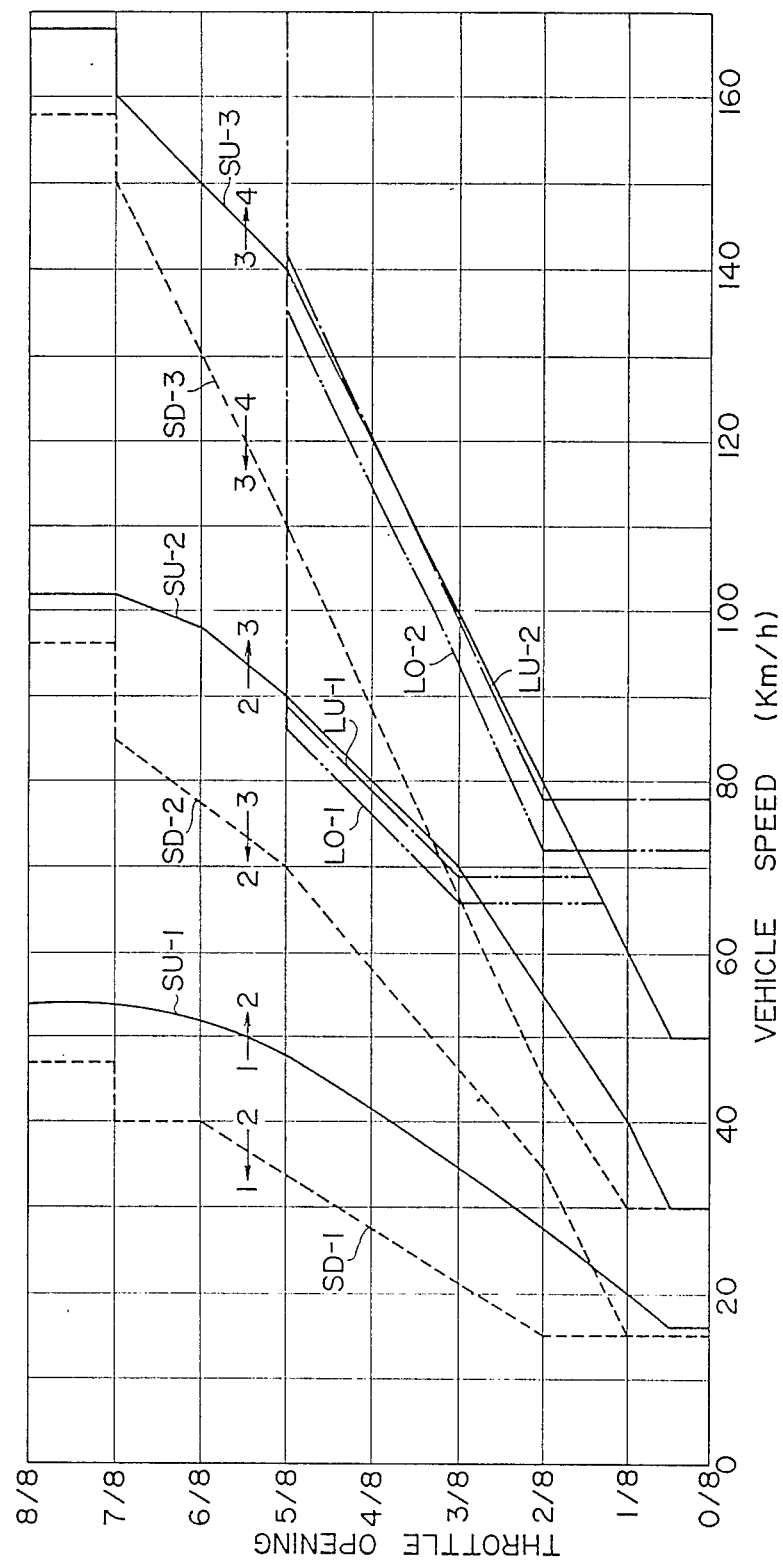
FIG. 7 is a transmission control schedule map according to which the control unit controls gear ratio of a gear train and lockup operation of the automatic transmission.

Referring to FIG. 7 showing a vehicle speed and lockup control schedule map for a four-speed automatic transmission equipped with a lockup torque converter, shift points are represented by broken curves SD-1, SD-2 and SD-3 for downshifts into low range and by solid curves SU-1, SU-2 and SU-3 for upshifts into high range. The lockup torque converter is adapted to be always unlocked when the shift lever 36 selects first or second gear. In the map, lockup flag ("FLAG 1") setting areas are defined by dotted lines LU-1 and LU-2 for third and fourth gears, respectively, and unlock flag ("FLAG 0") setting areas are defined by double dotted lines LO-1 and LO-2 for third and fourth gears, respectively.

In the case when the vehicle engine 1 is too cold to operate normally or when the throttle valve 14 is closed and an actual output from the throttle valve position sensor 18 is lower than the reference output, then the control unit 24 takes the steps S23 and S24 without renewing the reference output in the reference output setting means 20 so as to provide an unlock signal for unlocking the lockup torque converter 32 of the automatic transmission 30.

Figure 5:
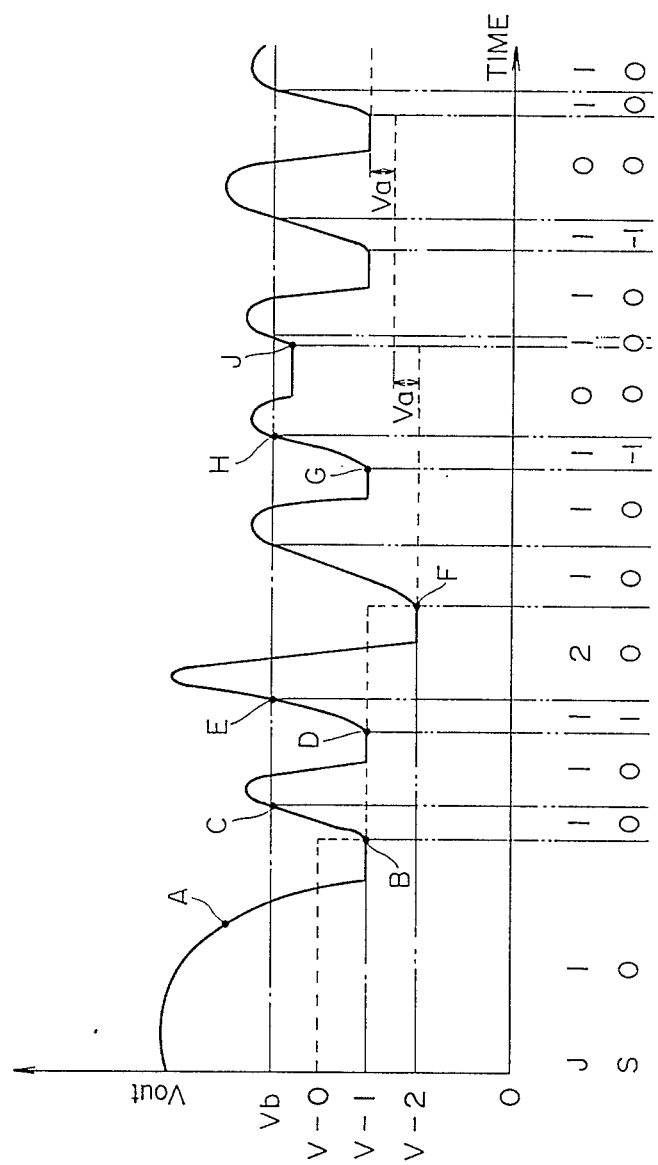
FIG. 5 is an example of output from the throttle valve position sensor for explaining reference output setting.

Operation of the throttle valve opening detecting device of a preferred embodiment according to the present invention will be more apparent from the description with reference to FIG. 5 showing an example of an output of the throttle valve position sensor 18. As is apparent from a winding line 40 shown in FIG. 5, the throttle valve 14 changes its angular position or opening ratio irregularly, so that the throttle valve position sensor 18 provides an output $V_{out}$ which varies every moment and becomes stable or unchanged for a while at various points. It is assumed that when the control unit 24 is powered on, evaluation value J, score S and the latest reference output $V_m$ set in the reference output setting means 20 are given as one(1), zero(0) and an output V-0 lower than the preset reference output $V_b$.

When the throttle valve 14 gradually closes, the throttle valve position sensor 18 provides an output $V_{out}$ gradually decreasing. At a time A, the output $V_{out}$ provided from the throttle valve position sensor 18 is judged at the step S4. Because the present output $V_{out}$ at the time A is larger than the preset reference output $V_b$, score S is maintained zero(0) and, therefore, evaluation value J is left intact, namely value one (1+0=1). At this time, the preset reference output $V_b$ is assumed as the last output $V_p$ for the next reference output setting sequence.

When the output $V_{out}$ gradually falls down and reaches an output V-1 smaller than the latest reference output $V_m$ which is now equal to the output V-0, the step S6 is carried out because the present output $V_{out}$ is sufficiently smaller than the preset reference output $V_b$. The present output $V_{out}$ levels off and is continued at the output V-1 till a time B for more than 0.5 sec. Since the last output $V_p$, which is the output V-1, is as large as the present output $V_{out}$ and is sufficiently smaller than the latest reference output $V_m$, the step 13 is taken to assume the the last output $V_p$ as large as V-1 as a new latest reference output $V_m$ in the reference output setting means 20, while setting the evaluation value to one (1) and score to zero (0).

As the throttle valve 14 is reversed to open, the throttle valve position sensor 18 provides a gradually increasing output $V_{out}$ starting at the time B. When the output $V_{out}$ reaches or beyond the preset reference output $V_b$ at a time C, the step S4 is carried out. Between the times B and C, the evaluation value J and score S are unchanged to be one (1) and zero (0), respectively. Then, at the step S5, the preset reference output $V_b$ is assumed as the last output $V_p$.

Between times C and D, the output $V_{out}$ drops again and reaches the output V-1 which is sufficiently smaller than the preset reference output $V_b$ and is continued unchanged for at least 0.5 sec. At the time D, because the last output $V_p$ is as large as the latest reference output $V_m$ which is equal to the output V-1, the step S11 is carried out to set score S to one (1). The throttle valve 14 gradually opens again and, at a time E, the output $V_{out}$ reaches the preset reference output $V_b$. Then, the step S5 is carried out to add the previous score S to the previous evaluation value J, while to reset the score S to zero (0). As a result, the evaluation value J becomes two (2), since the previous evaluation value was one (1) and the previous score S one (1). Simultaneously, the preset reference output $V_b$ is assumed as the last output $V_p$ for the next reference output setting sequence.

When the output $V_{out}$ drops again to an output V-2 which is much lower than the latest reference output $V_m$ which is now equal to the output V-1 and is continued unchanged for at least 0.5 sec till a time F, the step 13 is carried out. The last output $V_p$ which is equal to the present output $V_{out}$ or the output V-2 is set as a new latest reference value $V_m$ in the reference output setting means 20 for the next reference output setting sequence and the evaluation value J and score S are set to one (1) and zero (0), respectively. Thereafter, the output $V_{out}$ from the throttle valve position sensor 18 becomes stable or unchanged again at an output V-1. Since the output V-1 is larger than the output V-2 which has been, at this time, memorized as the latest reference output $V_m$ in the reference output setting means 20 and the evaluation value J is larger than zero (0), the step S15 is carried out to set score to minus one (−1). Thereafter, the output $V_{out}$ becomes significantly larger than the preset reference output $V_b$ at a time H. At the step S5, the preset reference output $V_b$ is assumed as the last output $V_p$, while the evaluation value J becomes zero (0) and score S is set to zero (0).

The output $V_{out}$ becomes stable at an output larger than the latest reference output $V_m$ equal to the output V-2 at a time J. At this time, since the last output $V_p$ for which the preset reference value $V_b$ was assumed at the time H and the evaluation value J is zero (0), the step 16 is carried out to establish and memorize a new latest reference output $V_m$ by adding a constant output $V_a$ to the latest reference output $V_m$ which is currently equal to the output V-2, while setting the evaluation value J and score S to one (1) and zero (0), respectively.

In such a way, every time the output $V_{out}$ becomes stable and is maintained unchanged at an output larger than the latest reference output $V_m$ but smaller that the preset reference output $V_b$ and the evaluation value becomes zero (0), a new latest reference output $V_m$ is established by adding the certain value of output $V_a$ to the latest reference output $V_m$ currently memorized. Therefore, if a considerably low output from the throttle valve position sensor 18 such as the output V-2 has been set as the latest reference output $V_m$ in the reference output setting means 20, the reference output $V_m$ is increasingly renewed when the output $V_{out}$ repeatedly becomes stable at outputs larger than the latest reference output $V_m$ set in the reference output setting means 20. On the other hand, if the output $V_{out}$ from the throttle valve position sensor 18 repeatedly becomes stable at the latest reference output $V_m$, the evaluation value which is added by the score every time the output becomes stable grows large, gradually declining the probability of correctively renewing the latest reference output $V_m$ memorized and set in the reference output setting means 20.

As apparent from the above example, according to the throttle valve control device of the present invention, even when the reference output setting means either accidentally or otherwise sets a reference output lower than an output to be actually provided by the throttle valve position sensor when the throttle valve is in its fully closed position, the reference output set in the reference output setting means is increasingly renewed as a result that the output becomes stable at or above an output larger than the latest reference output over again, resulting in an accurate detection of opening ratio of the throttle valve opening.

Figure 8:
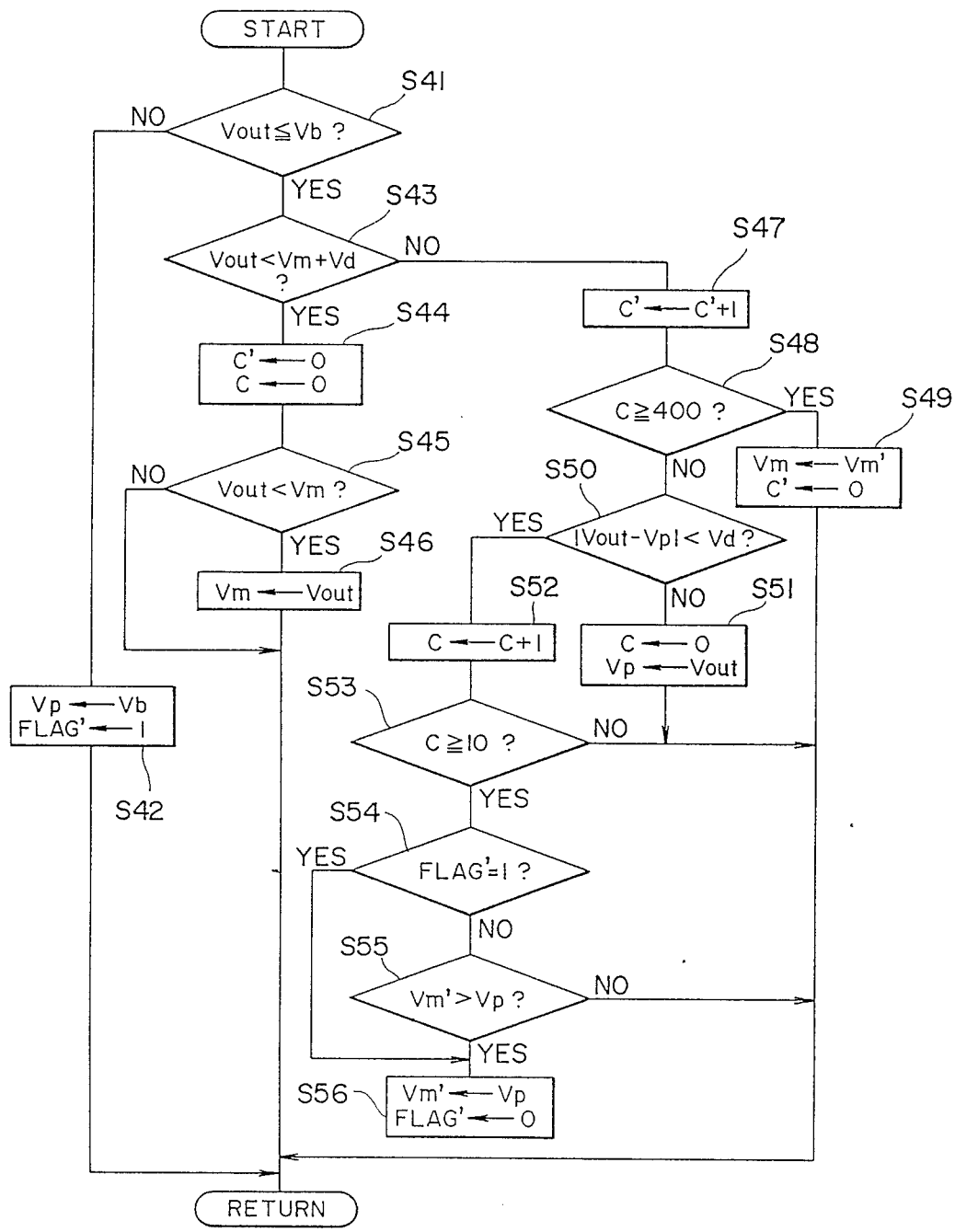
FIG. 8 is a flow chart, similar to FIG. 3, illustrating another embodiment of a reference output setting subroutine for the control unit.

Referring to FIG. 8, there is shown a flow chart of an alternative reference output setting subroutine in the reference output setting means 20. In this flow chart, a reference output $V_m$ memorized in the reference output setting means 20 is increasingly renewed when an output $V_{out}$ larger than the reference output $V_m$ is continued for more that a predetermined period of time, for example more that 20 sec. When a reference output $V_m$ is allowed to be increasingly renewed, "FLAG' 1" is given. Therefore, if there is "FLAG' 0" which means that a reference output $V_m$ memorized and set in the reference output setting means 20 is the latest renewed reference output, only a decreasing renewing is allowed. For counting the 20 sec time period, the reference output setting means includes another counter (which is referred to as a "C'" counter).

Upon the reference output setting subroutine starts, the first decision in FIG. 8 is made at a step S41: "is the present output $V_{out}$ smaller than the preset reference output $V_b$?" If the answer to the first decision is no, this indicates that the present output $V_{out}$ is larger than the preset reference output $V_b$, then, the preset reference output $V_b$ is assumed as the last output $V_p$ and "FLAG' 1" is established at a step S42 in order to assume the last output $V_p$ as the latest output $V_m$, when an output $V_{out}$ becomes smaller than the preset reference output $V_b$ and the "C" counter counts 10. Then, the step S42 orders return to the step S17 of the main routine of FIG. 2.

When the answer to the first decision is yes, another decision is made at a step S43: "is the output $V_{out}$ smaller than the reference output $V_m$?" This decision is made in consideration of the tolerance output $V_d$. If the output is smaller, the "C" counter and "C'" counter are set to zero (0) at a step S44. Thereafter, a decision is made at a step S45: "is the output $V_{out}$ is smaller than the reference output $V_m$?" If the output $V_{out}$ is smaller, the output $V_{out}$ is assumed as a reference output $V_m$ and memorized and set in the reference output setting means 20. Otherwise, the step 45 orders direct return to the step S17 of the main routine of FIG. 2.

If the answer to the other decision at the step S43 is no, the "C'" counter is incremented by one count (1) at a step S47. Thereafter, if the "C'" counter counts as many as or more than 400 counts which mean a 20 sec time period at a step S48, the reference output $V_m$ is renewed by the latest minimum output $V_{m'}$, while the "C'" counter is reset to zero (0) at a step S49. Then, the step S59 orders return to the step S17 of the main routine of FIG. 2. On the other hand, if the "C'" counter has not yet counted 400, the difference between the present output $V_{out}$ and the last output $V_p$ is compared with the tolerance output $V_d$ at a step S50. When the difference is larger than the allowable error of output $V_d$, the present output $V_{out}$ is assumed as the last output $V_p$ for the next reference output setting sequence, while the "C" counter is set to zero (0) at a step S51, then, the main routine of FIG. 2 is called for to perform the steps S17 through S21.

If the difference is smaller than the tolerance output $V_d$, namely the answer to the decision at the step S50 is yes, a decision is made as to the count of the "C" counter at a step S53, after incrementing the "C" counter by one count (1) at the step S52. If the count of the "C" counter is as large as or more than ten counts, the control unit 24 reads flag at a step 54. If "FLAG' 1" is read, the last output $V_p$ is assumed as the latest minimum output $V_{m'}$, while establishing "FLAG' 0" at a step S56. On the other hand, if "FLAG' 0" is read at the step S54, a decision is made at a step 55: "is the last output $V_p$ smaller than the latest minimum output $V_{m'}$?" When the last output $V_p$ is smaller than the latest minimum output $V_m$, and the answer to the decision is yes, the step S56 is taken. When the answer to the decision at S53 or S55 is no, then these steps call for the main routine of FIG. 2 to return to the step S17.

Although the present invention has been fully described by way of the preferred embodiments thereof with reference to the accompanying drawings, it is to be noted that various changes and modifications are apparent to those skilled in the art. Therefore, unless otherewise such changes and modifications depart from the scope of the present invention, they should be construed as included therein.

What is claimed is:

1. A throttle valve opening detecting apparatus for a vehicle engine connected with an automatic transmission comprising:

a throttle valve disposed in an intake manifold of a vehicle engine for controlling the amount of intake air reaching cylinders of said vehicle engine;

throttle valve opening sensor for providing an output proportional to an opening of said throttle valve;

reference output setting means for setting therein an output as a reference output representative of a closed position of said valve;

control means for receiving said output from said throttle valve opening sensor to decreasingly renew said reference output in said reference output setting means when the smallest output from said throttle valve opening sensor is smaller than said reference output or increasingly renew said reference output in said reference output setting means when said output from said throttle valve opening sensor is continuously larger than said reference output for a predetermined period of time while it is smaller than a predetermined output; and operating means for obtaining a ratio of opening of said throttle valve to be controlled based on a current output from said throttle valve opening sensor and said renewed reference output to provide a control signal representative of said opening ratio.

2. A throttle valve opening detecting apparatus as defined in claim 1, wherein said opening ratio of said throttle valve is obtained as a ratio of the difference between a preset output representative of the maximum opening of said throttle valve and said renewed reference output to the difference between a current output from said throttle valve opening sensor and said renewed reference output.

3. A throttle valve opening detecting apparatus as defined in claim 1, wherein said opening ratio of said throttle valve is obtained as a ratio of the difference between preset outputs representative of the maximum and the minimum opening of said throttle valve to the difference between a current output from said throttle valve opening sensor and said renewed reference output.

4. A throttle valve opening detecting apparatus as defined in claim 1, wherein, upon decreasingly renewing said reference output, an output from said throttle valve opening sensor smaller than said reference output is set as a renewed reference output in said reference output setting means.

5. A throttle valve opening detecting apparatus as defined in claim 1, wherein said preset reference output is set to an output for said throttle valve opened to a ratio of opening between 1/25 and 1/8.

6. A throttle valve opening detecting apparatus as defined in claim 5, wherein said reference output renewing means increasingly renews said reference output when an output from said throttle valve opening sensor is continuously kept unchanged for a predetermined period of time.

7. A throttle valve opening detecting apparatus as defined in claim 6, wherein said reference output increasingly renewing means renews said reference output when said unchangeable output continually appears for predetermined times.

8. A throttle valve opening detecting apparatus as defined in claim 1, wherein said reference output renewing means increasingly renews said reference output to an output increased by a predetermined output from said reference output.

9. A throttle valve opening detecting apparatus as defined in claim 1, wherein said vehicle engine is equipped with an automatic transmission with a lockup torque converter, lockup control and gear ratio control of said automatic transmission being performed based on an automatic vehicle speed control schedule drawn from a plurality of preset automatic vehicle speed control schedules depending upon said throttle valve opening ratio obtained by said operating means and a vehicle speed.

10. A throttle valve opening detecting apparatus as defined in claim 9, wherein, when said throttle valve opening sensor provides no output, said reference output setting means set therein a value corresponding to an output to be ordinarily provided by said throttle valve opening sensor when said throttle valve is opened half, thereby unlocking said lockup clutch.

11. A throttle valve opening detecting apparatus as defined in claim 1, wherein said throttle valve opening sensor comprises a variable resistance with a movable contact in cooperation with said throttle valve, a power source for applying a constant voltage to a fixed resistance of said variable resistance, and a potential detector for detecting a potential of said movable member.

12. A throttle valve opening detecting apparatus as defined in claim 1, wherein said reference output setting means is interrupted to set a reference output when the temperature of an engine coolant is lower than 50° C.

13. A throttle valve opening detecting apparatus for a vehicle engine connected with an automatic transmission comprising:
a throttle valve disposed in an intake manifold of a vehicle engine for controlling the amount of intake air reaching cylinders of said vehicle engine;
throttle valve opening sensor for providing an output proportional to an opening of said throttle valve;
reference output setting means for setting therein an output as a reference output representative of a closed position of said valve;
control means for receiving said output from said throttle valve opening sensor to decreasingly renew said reference output in said reference output setting means when the smallest output from said throttle valve opening sensor is smaller than said reference output or increasingly renew said reference output in said reference output setting means when said output from said throttle valve opening sensor is continuously larger than said reference output for a predetermined period of time while it is smaller than a predetermined output; and
means for judging whether said throttle valve is in an idle position by comparing said output from said throttle valve opening sensor with said reference output set in reference output setting means.

14. A throttle valve opening detecting apparatus as defined in claim 13, wherein, upon decreasingly renewing said reference output, said output lower than said reference output is set as a renewed reference output in said reference output setting means.

15. A throttle valve opening detecting apparatus as defined in claim 13, wherein said preset reference output is set to an output for said throttle valve opened to a ratio of opening between 1/25 and 1/8.

16. A throttle valve opening detecting apparatus as defined in claim 15, wherein said reference output renewing means increasingly renews said reference output when an output from said throttle valve opening sensor is continuously kept unchanged for a predetermined period of time.

17. A throttle valve opening detecting apparatus as defined in claim 16, wherein said reference output renewing means renews increasingly said reference output when said unchangeable output continually appears for predetermined times.

18. A throttle valve opening detecting apparatus as defined in claim 16, wherein, upon increasingly renewing said reference output, an output from said throttle valve opening sensor is continuously kept unchanged as a renewed reference output in said reference output setting means.

19. A throttle valve opening detecting apparatus as defined in claim 18, wherein said vehicle engine is equipped with an automatic transmission with a lockup torque converter, said lockup torque converter being unlocked always when said throttle valve is judged to be closed.

* * * * *